Aug. 17, 1954 P. ARBEIT ET AL 2,686,820
GLASS FURNACE AND PROCESS FOR MELTING GLASS
Filed July 3, 1951 2 Sheets-Sheet 2

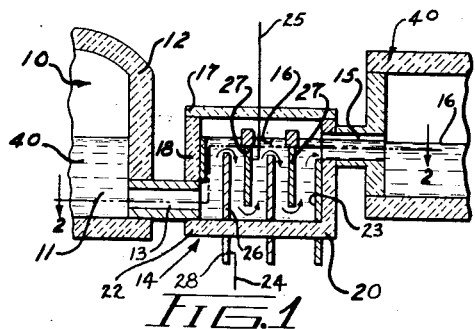

INVENTORS
PIERRE ARBEIT
LOUIS THEBALT

BY
Bauer and Seymour
ATTORNEYS

Patented Aug. 17, 1954

2,686,820

UNITED STATES PATENT OFFICE 2,686,820

GLASS FURNACE AND PROCESS FOR MELTING GLASS

Pierre Arbeit, Paris, and Louis Thebault, Sucy-en-Brie, France, assignors to Societe Anonyme des Manufactures des Glaces et Produits Chimiques de Saint-Gobain, Chauny & Cirey, Paris, France Application July 3, 1951, Serial No. 235,002

Claims priority, application France July 4, 1950

14 Claims. (Cl. 13—6)

This invention relates to an improvement in glass furnaces. This invention is particularly useful in the fining of glass. The invention is shown in the accompanying drawings as applied to a fining cell in a novel furnace of special construction. In this furnace, there is a fining cell constituting in effect a separate chamber which is in communication with other parts of the furnace, in one of which the glass raw material is melted and in another of which conditioning and working occur.

In the manufacture of glass there are three essential steps, and these steps are carried out at different temperatures. In the first step the solid raw materials are melted, temperatures on the order of 1000 to 1250° C. being customary. In furnaces of the type wherein the melting and fining are carried out in a single compartment, control of the process has been difficult, the fined and crude molten glass mingle as the convection currents in the glass compel.

In order to bring the crude glass into a state useful for the manufacture of glass articles, the crude molten glass is brought to a fining temperature which is on the order of 1450° C. Glass at that temperature is too fluid and too hot to work with and it must be cooled down and conditioned before it is used, which is accomplished in a conditioning or working chamber wherein the glass is allowed to attain a temperature and viscosity best suited for its use. In manufacture, the working temperature varies with different glasses but is always much lower than the fining temperature.

In the making of glass it is an object of the glass maker to produce a glass of uniform composition. It has been surmised by different authorities that the internal construction of glass is different at different temperatures. Most glass furnaces of the prior art are so constructed that material temperature differences exist at different places within the furnace. Furnace development has not produced a furnace capable of assuring the identical treatment of all the glass in a furnace, so far as the published art shows.

It is an object of this invention to make a glass furnace capable of subjecting all parts of the glass to substantially identical fining treatment. A particular object of the invention is, in a continous furnace, to subject all parts of the glass to identical fining conditions by means of a novel fining cell.

The objects of the invention are accomplished generally speaking by means of a furnace which has a cell in which the glass is compelled to follow a narrow reversing channel which is normal to the longitudinal axis of the furnace, and in which it is subjected to heating by Joule effect.

In conformity with the invention a fining cell is interiorly furnished with energizable baffles, between and over and under which, the glass flows. The walls may also be lined with graphite. Opposite baffles are connected to opposite poles of a source of current so that the electric current, preferably alternating current, passes through the baffles and through the glass of the cell from baffle to baffle. A sufficient quantity of electrical energy is expended in the glass passing through and between the baffles to furnish enough heat to raise the glass to fining temperature. The glass is maintained in the cell for a time sufficient to fine it. The novel cell is preferably partitioned, transversely to the general direction of movement of the glass along the furnace, by a plurality of baffles, alternately extending into the glass from above and below, which conduct electricity and are preferably made of the same material that constitutes the novel lining of the furnace.

These baffles extend alternately up from the bottom and down from the surface of the glass, overlapping so as to provide vertical channels through which the glass flows, flowing under one baffle and over the next. Thus the glass is obliged to follow a path between the baffles, ascending on one side of a baffle and descending on the other, so that the general motion of the glass in the cell is vertically upward and downward except directly under or over the baffles.

As the amount of electricity available is at the command of the glass maker he may make his furnace of large or small capacity as he wishes, being guided by the quantity of energy available.

The baffles may be constructed of graphite or other carbon forms, which possess the property of being simultaneously a conductor of electricity and practically unattackable by glass under these conditions, or of certain metals such as molybdenum and tungsten.

In the drawings there is illustrated an embodiment of the invention and some modifications thereof.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 shows a diagrammatic view in longitudinal vertical section midway through a furnace including the invention;

Fig. 2 is a special modification, the view being taken in horizontal section;

Fig. 3 is a vertical sectional view on the line 3—3 of Fig. 4;

Fig. 4 is a horizontal sectional view on the line 4—4 of Fig. 3;

Fig. 5 is a vertical section taken transversely of the furnace on the line 5—5 of Fig. 4;

Figure 6:
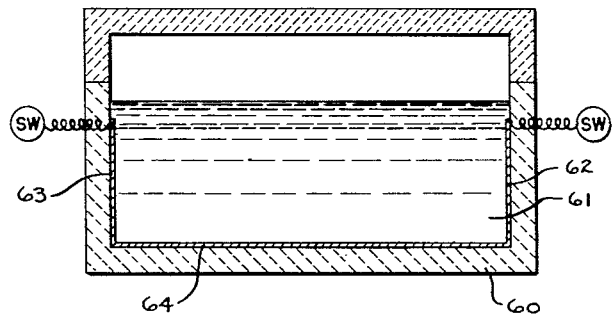
Fig. 6 is a vertical cross sectional view through a modification.

The numeral 10 indicates the melting chamber of the furnace, which is heated by any convenient method, for instance by flame, in which crude molten glass 11 is produced from solid raw materials. At the bottom of this chamber, is a small conduit 13. The construction of such conduits has been illustrated and described and will not be dealt with herein. The conduit 13 admits the crude molten glass to the fining chamber 14, which is cubical, in the form of the drawing, and is provided with an outlet conduit 15 which is partly below and partly above the surface 16 of the glass. The top 17 of the fining cell is removable and it, together with the four walls and bottom 22 are composed of refractories of the type normally employed in the construction of glass furnaces, but the end walls 18, 20, are interiorly lined with plates 23 of graphite which cover them from the bottom to, or slightly above, the glass level, so as to keep the molten glass from contacting the less resistant refractories of the walls. In the particular furnace shown in Fig. 1 the bottom and sides are not shown to be covered with graphite, but in a special form of the invention they may also be so covered, as shown in Fig. 6, wherein 60 is the furnace, 61 the molten glass, 62—63 the graphite revetments on the walls, and 64 is the graphite revetment on the bottom.

In the preferred form of the invention the fining cell is actually a cube, but it can be of other shapes with no impairment of the invention except a small loss of thermodynamic efficiency, the cube being most efficient.

In the preferred form of the invention the glass is caused to flow through the cell 14 in a reversing channel of small depth or thickness which is normal to the general direction of flow of glass through the furnace. This is accomplished in the form of invention of Fig. 1 by the use of vertical baffles 26, 27, of which baffles 26 extend upwardly from the bottom of the cell and from wall to wall, their lower and side edges being rabbeted into the walls and bottom, and their upper edges being below the level of the glass in the cell. The baffles 27 extend downwardly into the glass from the glass level or somewhat above it and extend from wall to wall but do not reach the bottom, sufficient space being left between baffles 26 and the upper glass surface and between baffles 27 and the bottom to permit the flow of glass over and under the respective baffles. The cross section under a baffle may well approximate the cross section of the space between baffles. The glass coming into the cell through conduit 13 thus proceeds upward in a channel, formed between first baffle 26 and the revetment 23, to the surface, being heated in its passage by current passing between baffles 26 and 27, the end plates, and their adjacent baffles. As it reaches the surface the glass passes over the first baffle 26 and downwardly between it and second baffle 27, being continuously heated by the passage of current through the glass. This heating process continues throughout the passage of the glass through the cell, during which it is brought to the requisite fining temperature and maintained there, the bubbles formed in fining being discharged at the surface as the glass passes over the submerged baffles. Thus, the glass is subjected to heating while submerged, is brought close to a free surface where it can discharge its bubbles, is again subjected to submerged heating and once more brought into proximity to a free surface, this process being continued as often as is necessary to produce a perfect fining.

Graphite projections 28 extend from the baffles downward through the furnace floor from the ends of the baffles and current may be imparted to such projections by conductors 24 as desired. Current carrying conductors 25 of opposite polarity are connected to baffles 27.

In the preferred form of the invention the baffles are vertically arranged and extend from wall to wall, spaces being provided at the bottom of one baffle and at the top of the next for the flow of glass, but in another form of the invention the baffles may all extend from the bottom to the surface, projecting across the furnace alternately from opposite walls, so as to move the glass in horizontal paths normal to the axis of the furnace. Thus, one baffle may extend from wall 20 almost to wall 21, and the next may extend from wall 21 almost to wall 20, all longitudinal flow taking place around the sides of the baffles, rather than over and under them as in the preferred form. In the modification thus described the bubbles generated at the absolute bottom must take their way upward through a height equal to the full depth of the glass, whereas the preferred form brings all the glass close to the surface repeatedly and makes the release of bubbles easier and surer and the glass better.

Figure 7:
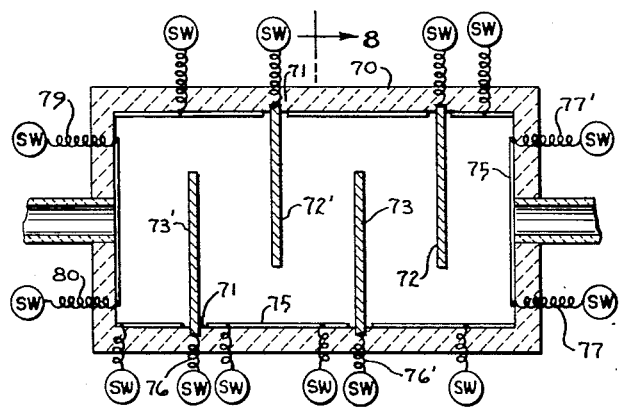
Fig. 7 is a horizontal cross sectional view through a fining cell embodying a modified form of the invention.
Figure 8:
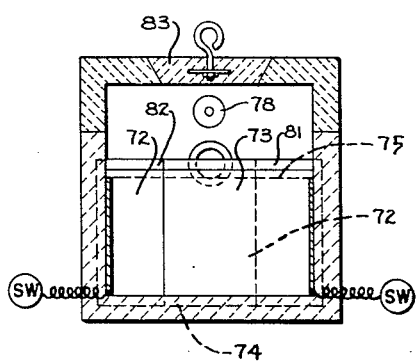
Fig. 8 is a section on line 8—8 of Fig. 7.

In Figs. 7 and 8 the furnace wall 70 is provided with vertical rabbets 71 in which the baffles 72—73 are mounted, alternate baffles extending into the furnace from opposite sides. The rabbets may be extended into the sole of the furnace, as shown at 74. Conductive plates 75 line the walls. Electrical connections 76—77 introduce current to such parts of the cell as it is desired to electrify.

The baffles are seated in rabbets in the walls and floor or in rabbets in posts which are themselves seated in walls and floor.

This invention also contemplates the use of auxiliary heating means in the novel cell, for instance flame or induction. An oil burner 78 in Fig. 8 illustrates the use of such auxiliary heating means. It is to be understood that such auxiliary heating is not essential, but in some cases may be desirable.

In Figs. 3 and 4 is shown, in some detail, the construction of the furnace of Fig. 1. In these figures the numeral 16 indicates the glass level, established by the upper surface of the glass during the normal operation of the furnace. The refractory end wall is not shown but the conductive plates 26, 27 are more clearly shown. Vertical graphite posts 30 have tongues 31 seated in grooves in the tank wall. In their inward faces they are provided with rabbets 33 for the reception of the ends of baffles 26, 27. The baffles may extend completely across the furnace as a single plate or graphite posts 34 may be installed midway to reduce the sizes of the sheets, such posts being mounted in the bottom in post holes prepared for the purpose or in any convenient way.

The baffles 27 are suspended from refractory bridges or bars 35 which are supported at their ends in opposite walls of the furnace and are above the glass level, so as to prevent the oxidation of the baffles.

In the operation of the furnace, glass raw materials are put into the melting chamber 10 and are there reduced to crude molten glass by heat of any satisfactory kind, for instance, flame, filling the furnace to the level 30. The crude molten glass 40, flows through the conduit 13 into the space between wall 18 and first baffle 26. As the glass is withdrawn from the working chamber 40 it entrains a flow of glass from cell 10 through the cell 14 in which it passes upward between the wall 18 and baffle 26, and over the top of baffle 26 into the neighborhood of free surface 30, and down between baffles 26 and 27, then under baffle 27 and up to the surface again. As it flows, heat is imparted to it by the flow of current between baffles and end plates which are connected to opposite poles of a generator or to any suitable source of current.

This alternate up and down flow continues through the cell until the glass finally flows through the outlet 15 into the working chamber 40. The capacity of the space between wall 18 and first baffle 26 is greater than that of inlet 13 so that the glass proceeds more slowly in the cell and is provided with ample time for the completion of fining. The exact length of time will depend on such factors as the size of the cell and the power input, which can be selected by the furnace man.

The glass thus treated is uniformly treated, each cubic volume receiving the same, or substantially the same treatment as each other cubic volume.

The glass travels much farther through the cell than the length of the cell. The current heats both the walls and the glass.

The bars which support baffles 27 may be made of refractories like the material used in the outer wall of the furnace to reduce the danger of oxidizing the graphite of a graphite bar.

It is possible to connect the end wall revetments to conductors of opposite polarity, employing the intermediate baffles as idler electrodes, or to connect some of the baffles to a source of current and others not, or to connect all the revetments so as to heat them as resistors and to connect the baffles so as to use them as electrodes for the introduction of current into the glass. Thus, in Fig. 7, the graphite plate can be made a resistor by passing current through it from lead 79 to lead 80. The current in 72' may be turned off, while 73—73' are used as opposite poles supplied with current, through leads 76—76', 72' thus becoming an idler electrode. By supplying each revetment with a plurality of leads (77—77', etc.) they can be connected in circuit as desired, either as electrodes to pass current through the glass, or as resistors, or as both electrodes and resistors, as hereinbefore explained, when some current goes through the glass and some through a revetment. Thus, one can make any of the connections necessary to carry out the provisions of this paragraph by connecting or disconnecting particular leads to suitable sources of electric current.

The portions of the plates 72—73 that extend above the glass level are protected by coatings of alumina, or by removable caps of ordinary refractories, 81—82 that can be emplaced or removed through lid 83 in the dome of the cell.

The invention as thus far described has the following advantages:

The invention enables one to employ a larger amount of electrical energy in a smaller volume of glass than has been permitted by other furnaces, thus raising the glass to high temperature and maintaining its temperature with equal temperature in all parts. In particular, the vertical circulation imposed on the glass between the baffles causes the glass to follow a long path in a reduced space, in the course of which it is heated very evenly without any part of it escaping this heating. As it is obliged to return frequently to the surface, the bubbles of gas formed in it, even very tiny bubbles, are liberated easily and if the length of the passage through the cell is sufficient all of the glass will have been completely and evenly fined.

To avoid the combustion of the part of the wall composed of graphite, or of the parts of the baffles that extend above the glass, their tops can be protected by covering them with alumina. Ordinary refractory materials can also be used despite their tendency to more rapid deterioration, provided they are frequently replaced, which can easily be done by removing the cover of the cell, or by providing lids in the cover, through which the worn pieces can be removed and replaced.

In the special case of Figure 2 and Figure 5, the entire wall and even the bottom of the cell are covered with plates of graphite which are generally indicated by the numeral 50. The conductor 51 and the conductor 52 are opposite, bringing current to these walls in opposite positions of the cell. The walls 50 are mainly composed of ordinary refractory carrying a revetment of graphite on their inner surface.

The baffle construction herein before described is also used in this modification, and some details of construction are shown in Figure 5, wherein the side plates 50 are illustrated in cross section, the baffles being composed of plates 53, 54, 55 which are rabbeted in the posts 30, 34, leaving a space 56 at the bottom beneath which the glass can flow. As shown in Figure 5 the glass level is about at the top of baffle plate 55.

In this case the glass is heated by the graphite plates acting as resistors but it requires a relatively heavy input of current.

As many apparently widely different embodiments of the present invention may be made without departing from the spirit and scope thereof, it is to be understood that the invention is not limited to the specific embodiments.

What is claimed is:

1. In a glass furnace of continuous flow type a tank for crude molten glass, a tank for holding fined glass for working, and a tank for the fining of the crude glass consisting essentially of a cubical chamber connected to said first named tanks by conduits, said cubical chamber being lined on its ends up to about the glass level with graphite plates, spaced graphite plates extending substantially from wall to wall of said chamber across the flow of glass along the furnace, of which alternate plates extend down from the surface of the glass close to the bottom of the chamber and up from the bottom of the chamber close to the upper surface of the glass respectively, providing a reversing path through the chamber, and electric conductors of opposite polarity connected to adjacent plates.

2. A glass furnace of continuous flow type having a chamber, inlet conduit means in a wall of said chamber adapted to admit glass to said chamber, outlet conduit means in a wall of said chamber adapted to permit the flow of molten glass from said chamber, the said chamber comprising a tank and oppositely disposed, staggered baffles constituting electrodes in the tank, the glass contacting parts of which comprise a high refractory conductor interposed between the inlet conduit and the outlet conduit, said baffles being in contact with said walls, and electrical conductor means of opposite polarity in connection with opposed parts of said tank and with opposed baffles.

3. A glass furnace tank having the glass contacting part of its side and end walls composed of an electrical resistance of melting point above 1450° C. inlet conduit means to admit glass to said tank, oppositely disposed outlet means in said tank, overlapping, staggered baffles comprised of electrically conductive material constituting electrodes interposed in said tank between said inlet and outlet, and electrical conductor means of opposite polarity connected to oppositely disposed baffles.

4. In a glass furnace in which the glass flows from end to end between walls, several oppositely disposed baffle means including baffle means extending upward from the bottom and from wall to wall beneath the upper surface of the glass, baffle means constituting electrodes extending downward from the upper surface of the glass and from wall to wall close to the bottom of the furnace, and upwardly and downwardly extending baffle means being overlapped and alternately placed across the flow of the glass whereby to compel the glass to travel in alternate upwardly and downwardly extending channels, and electric current conducting means of opposite polarity connected to adjacent baffles.

5. A glass furnace having end to end flow of the glass, a zone of said furnace having alternately upward and downwardly extending overlapped baffles alternately spaced from the surface of the glass and the bottom of the furnace, and electrical means to heat the glass by Joule effect and the baffles as resistances.

6. A glass furnace fining cell comprising alternately disposed overlapping baffles composed of electrically conductive material softening above 1450° C. and alternately spaced from the upper surface of the glass and the bottom of the tank, and electrical current supply means oppositely disposed to pass current through said baffles and said glass.

7. A glass furnace comprising a cubical cell having a revetment of graphite on a wall, said graphite revetment being connected at opposed points to conductors of opposite polarity, and graphite baffles extending across said cell and receiving current of heating intensity.

8. A glass furnace having a cubical fining cell, and a narrow reversing channel through said cell which is normal to the longitudinal axis of the cell, said channel having walls comprising Joule effect electrodes.

9. The method of fining glass that comprises flowing the glass in a broad and shallow stream through a fining zone, heating the glass in the zone to fining temperature, maintaining the stream out of contact with the air during the greater part of its passage through the zone, and exposing the breadth of the stream to the air during its passage through the zone for a time sufficient to permit the release of the bubbles formed therein.

10. A glass furnace tank having the glass contacting part of its side and end walls composed of an electrically conductive material which is resistant to attack by glass, inlet conduit means to admit the glass to said tank, oppositely disposed outlet means in said tank, overlapping, staggered baffles composed of electrically conductive material interposed in said tank between said inlet and outlet, and electrical conductor means of opposite polarity connected to oppositely disposed baffles.

11. A glass furnace tank according to claim 10 in which the baffles are alternately connected to opposite polarities.

12. A glass furnace tank according to claim 10 in which the electrically conductive parts of the end walls of the tank parallel to the baffles are connected to opposite polarities in order to constitute electrodes as the baffles.

13. A glass furnace tank, in which glass flows from end to end, having alternately upward and downwardly extending overlapped baffles alternately spaced from the surface of the glass and the bottom of the tank, opposed longitudinal walls of the tank being provided with coatings of an electrically conductive material and being in contact with the opposed lateral edges of the baffles, said coatings being connected to opposite poles of a source of electrical current to heat the glass by Joule effect and the baffles as resistance.

14. A glass furnace which comprises a horizontal tank, in which glass flows from end to end, having overlapping staggered baffles extending transversely to the length of the tank between the ends of the tank and composed of electrically conductive material, at least two of said baffles being connected to opposite poles of a source of electrical energy and constituting electrode heating means for passing current through the glass.

References Cited in the file of this patent

UNITED STATES PATENTS

| Number | Name | Date |
|---|---|---|
| 1,051,036 | Voelker | Jan. 21, 1913 |
| 1,594,496 | Clark | Aug. 3, 1926 |
| 1,598,307 | Pike | Aug. 31, 1926 |
| 2,010,055 | Brown | Aug. 6, 1935 |
| 2,159,361 | Atkinson et al. | May 23, 1939 |
| 2,188,927 | Slayter | Feb. 6, 1940 |
| 2,212,528 | Slayter | Aug. 27, 1940 |
| 2,331,946 | Pazsiczky et al. | Oct. 19, 1943 |
| 2,360,373 | Tiede | Oct. 17, 1944 |
| 2,377,772 | Fletcher et al. | June 5, 1945 |
| 2,398,952 | Nachop | Apr. 23, 1946 |
| 2,482,299 | Stevens | Sept. 20, 1949 |
| 2,512,761 | Arbeit | June 27, 1950 |
| 2,523,030 | Labino | Sept. 19, 1950 |